United States Patent
Gilson et al.

(10) Patent No.: US 11,743,314 B2
(45) Date of Patent: Aug. 29, 2023

(54) DATA PUBLICATION AND DISTRIBUTION

(71) Applicant: Comcast Cable Communications, LLC, Philadelphia, PA (US)

(72) Inventors: Ross Gilson, Philadelphia, PA (US); Dustin Addison, York, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/917,348

(22) Filed: Jun. 30, 2020

(65) Prior Publication Data

US 2021/0112108 A1    Apr. 15, 2021

Related U.S. Application Data

(63) Continuation of application No. 14/663,951, filed on Mar. 20, 2015, now Pat. No. 10,742,703.

(51) Int. Cl.
| | |
|---|---|
| *H04L 65/75* | (2022.01) |
| *H04N 21/24* | (2011.01) |
| *H04L 65/61* | (2022.01) |

(52) U.S. Cl.
CPC .............. *H04L 65/75* (2022.05); *H04L 65/61* (2022.05); *H04N 21/24* (2013.01)

(58) Field of Classification Search
CPC ........ H04L 65/60; H04L 65/4069; H04N 7/24
See application file for complete search history.

(56) References Cited

U.S. PATENT DOCUMENTS

| | | | |
|---|---|---|---|
| 6,980,972 B1 | 12/2005 | Allibhoy et al. | |
| 7,990,865 B2 | 8/2011 | Chu et al. | |
| 8,000,339 B2 | 8/2011 | Ananthakrishnan et al. | |
| 8,051,454 B2 * | 11/2011 | Krikorian | H04N 19/152 |
| | | | 725/94 |

(Continued)

FOREIGN PATENT DOCUMENTS

| | | |
|---|---|---|
| EP | 2830318 A1 | 1/2015 |
| WO | 2012018339 A1 | 2/2012 |

OTHER PUBLICATIONS

Pixorial Launches Krowds Video for Android, MarketWired, May 7, 2013 (accessed on Aug. 4, 2014) (available at: http://finance.yahoo.com/news/pixorial-launches-krowds-video-android-130000191.html) (4 pages).

(Continued)

*Primary Examiner* — Esther B. Henderson
(74) *Attorney, Agent, or Firm* — Ballard Spahr LLP

(57) ABSTRACT

Provided are methods and systems for data distribution over a network. A device can capture content. The device can be configured to publish the content so that other devices in a network can access the content. The publishing device can indicate to other devices on the network that the content is available for use. In response, the publishing device can receive requests for the content from the other devices. When sending a request, a requesting device can include viewing parameters that indicate capabilities of the requesting device. The publishing device can create one or more data layers that comprise the content based on the viewing parameters of requesting devices. The publishing device can also determine a transmission path to the various requesting devices and transmit the one or more data layers along the transmission path.

20 Claims, 8 Drawing Sheets

(56) References Cited

U.S. PATENT DOCUMENTS

| | | |
|---|---|---|
| 2003/0172131 A1 | 9/2003 | Ao |
| 2004/0015729 A1 | 1/2004 | Elms et al. |
| 2006/0023748 A1 | 2/2006 | Chandhok et al. |
| 2010/0333209 A1* | 12/2010 | Alve .................... H04L 63/102 |
| | | 726/26 |
| 2011/0225311 A1 | 9/2011 | Liu et al. |
| 2012/0117632 A1 | 5/2012 | Curtis et al. |
| 2013/0038618 A1 | 2/2013 | Urbach et al. |
| 2013/0060661 A1 | 3/2013 | Block et al. |
| 2013/0194967 A1 | 8/2013 | Melander et al. |
| 2013/0242106 A1 | 9/2013 | Leppaenen et al. |
| 2014/0052738 A1 | 2/2014 | Connell et al. |
| 2014/0067315 A1 | 3/2014 | Leppanen et al. |
| 2014/0133825 A1 | 5/2014 | Kozloski et al. |
| 2014/0192200 A1 | 7/2014 | Zagron |
| 2014/0280515 A1* | 9/2014 | Wei ....................... H04L 67/565 |
| | | 709/203 |
| 2014/0328382 A1 | 11/2014 | Lee |
| 2015/0256903 A1* | 9/2015 | Walker ............. H04N 21/23614 |
| | | 725/32 |
| 2016/0173553 A1* | 6/2016 | Panje .................. H04L 65/4092 |
| | | 709/219 |
| 2016/0219248 A1 | 7/2016 | Reznik et al. |

OTHER PUBLICATIONS

Extended Search Report and Written Opinion dated Oct. 28, 2016 by the European Patent Office for EP Application No. 16161054.8, which was filed on Mar. 18, 2016 and published as EP 3070950 on Sep. 21, 2016 (Applicant-Comcast Cable Communications, LLC.) (12 pages).

* cited by examiner

DATA PUBLICATION AND DISTRIBUTION

CROSS REFERENCE TO RELATED PATENT APPLICATION

This application is a continuation of U.S. application Ser. No. 14/663,951, filed on Mar. 20, 2015, which is herein incorporated by reference in its entirety.

BACKGROUND

In various situations, a user of a mobile device may want to capture content such as audio, video, pictures, sensor data, and the like for a given moment. Due to the location of the user, mobile device limitations, or other factors, the user's mobile device might only be able to capture low quality content, if at all. Other users might be able to capture the same content but at a higher quality. However, it is difficult or impossible for the user of the mobile device to access the content produced by other nearby devices. These and other shortcomings are addressed by the present disclosure.

SUMMARY

It is to be understood that both the following general description and the following detailed description are exemplary and explanatory only and are not restrictive. Provided are methods and systems for data (e.g., content) distribution over a network. In an aspect, a device can capture content via a camera, microphone, and/or sensors. The device can be configured to publish the content so that other devices in a network can access the content. The publishing device can indicate to other devices on the network that the content is available for use. In response, the publishing device can receive requests for the content from the other devices. When sending a request, a requesting device can include one or more viewing parameters (e.g., bit rate, resolution, and the like) that indicate capabilities of the requesting device. The publishing device can create one or more data layers that comprise the content based on the viewing parameters of requesting devices. The one or more data layers can comprise a base layer upon which one or more enhancement layers can be stacked to further enhance the quality of the underlying data. The base layer can be decoded to obtain the content at a minimum quality level and the enhancement layers can be applied to improve content quality. More than one data layer might be needed to satisfy different viewing parameters of different requesting devices. The publishing device can also determine a transmission path to the various requesting devices (in some instances through intermediary (non-requesting) devices) and transmit the one or more data layers along the transmission path. A first intermediary device can be configured to transmit a minimum number of data layers to the downstream requesting device to satisfy the different viewing parameters of the different requesting devices. In an aspect, the first intermediary device (if also a requesting device) can decode a number of the data layers received based on capabilities of the first intermediary device and can render the content accordingly.

In an aspect, provided are methods and systems for data distribution over a network. A publishing device can receive a request for published data from a requesting device that comprises a viewing parameter. The publishing device can determine a transmission path to the requesting device through a plurality of devices and can determine one or more devices on the transmission path that have also requested the data (and with a respective viewing parameters). Based on the viewing parameter and the respective viewing parameters (if any), the publishing device can generate one or more data layers that comprise the published data requested and transmit the one or more data layers to a first intermediary device on the transmission path.

In an aspect, provided are methods and systems for data distribution over a network. A requesting device can discover a publishing device from a plurality of devices that comprise a network. The publishing device can be any device that publishes data for use by other devices. The requesting device can receive an indication that provides information about the data and can present the indication to a user of the requesting device. The requesting device can receive a selection of the publishing device (for example, based on the indication) and determine a transmission path through the plurality of devices to the publishing device. The transmission path can be determined based on one or more transmission parameters associated with the plurality of devices. Transmission parameters can comprise, for example, processing resources, transcoding resources, network resources, established links between devices, network bandwidth rating associated with each link, packet loss metrics associated with each link, latency, battery life, and the like. The requesting device can transmit, based on the selection, a request for the data to a first intermediary device on the transmission path. The request can comprise a viewing parameter. In response to the request, the requesting device can receive one or more data layers, wherein the one or more data layers comprise the data requested that at least satisfies the viewing parameter.

In another aspect, provided are methods and systems for data distribution over a network. A first intermediary device can receive a plurality of data layers, a transmission path, and a transmission parameter. The plurality of data layers can comprise data originating from a publishing device. The transmission path can provide directions for transmission of the plurality of data layers through a plurality of devices to a requesting device for the plurality of data layers. The first intermediary device can then determine a second intermediary device (which can be the requesting device, an intermediary(non-requesting) device, or a device acting as both) of the plurality of devices to send the plurality of data layers based on at least the transmission path. Prior to sending the plurality of data layers, the first intermediary device can select one or more of the plurality of data layers to send. The first intermediary device can then send the selected one or more of the plurality of data layers to the second intermediary device.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
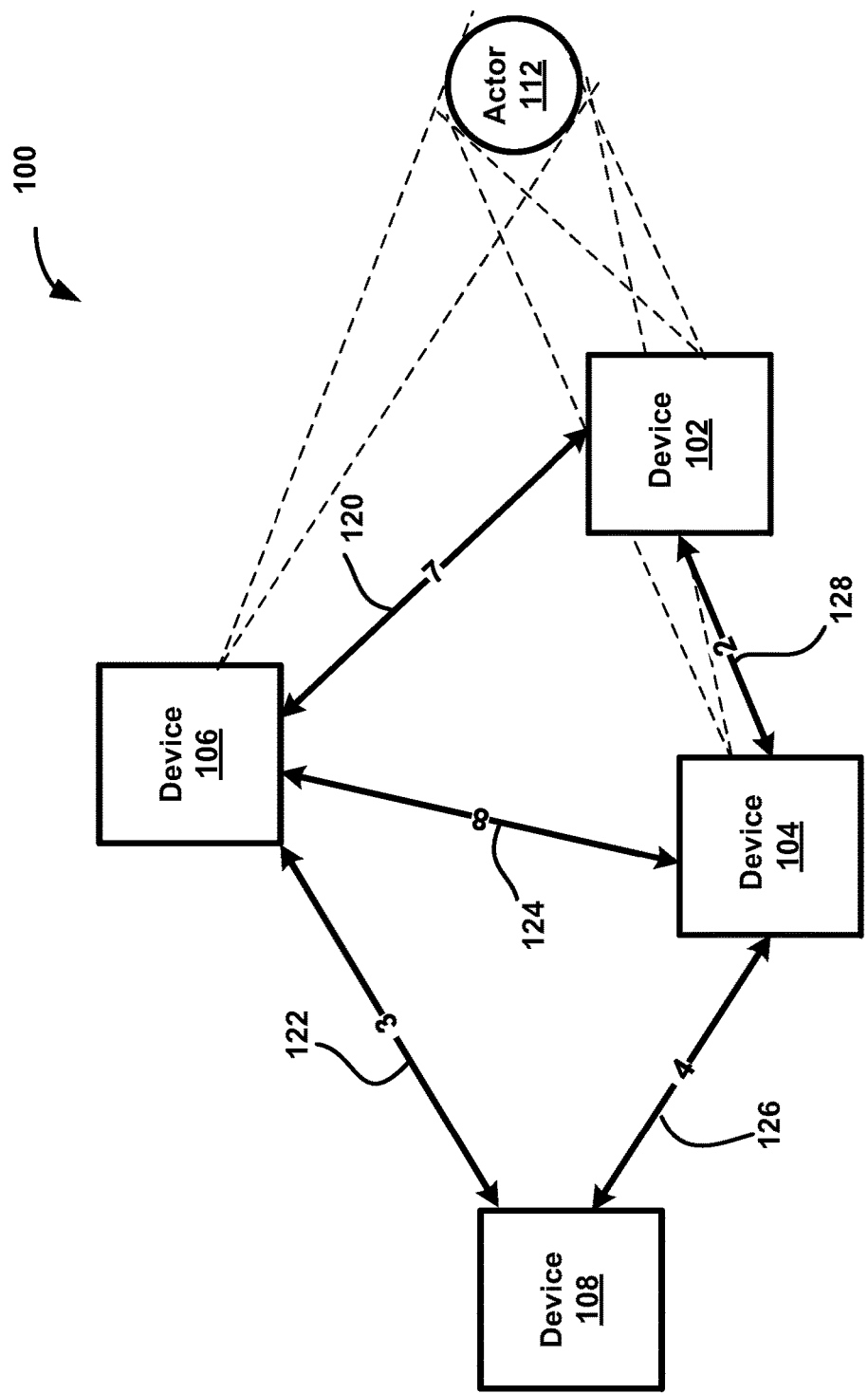
FIG. 1 is a block diagram of an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, solid state storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to publishing and distributing data over a network. In an aspect, a user of a device might desire to capture content at an event such as a concert. However, users are often limited in their physical location, or there may be limitations with recording content themselves (e.g., raining out or foggy). Users are unable to easily use other individuals' media which may be in a better location or more professionally produced.

In an aspect, a device can connect to one or more other devices on a network of a plurality of devices. The device can connect to the network to send and receive data. To direct the device to the network, Bluetooth/Bluetooth low energy (BLE) beacons, near field communications (NFC), domain name system (DNS) redirection, or quick response (QR) codes can be used.

In an aspect, a publishing device on the network can publish data that is generated or stored by the publishing device. By way of example, the publishing device can comprise a camera, a smart phone, a tablet computer, a laptop computer, a microphone, a data sensor, a wearable device, and the like. The publishing device can receive one or more requests for the published data from one or more requesting devices. A requesting device can comprise a smart phone, a tablet computer, a laptop computer, a wireless access point, a network device, a personal computer, a wearable device, and the like. The published data can comprise one or more of image data, audio data, video data, sensor data, and the like. The published data can comprise real-time data and/or stored data. Along with the one or more requests, the publishing device can also receive information that describes capabilities of the one or more requesting devices from the one or more requesting devices. The information can comprise one or more viewing parameters that can describe, for example, video resolution capabilities, screen size, video codec/bit rate, and/or audio codec/bit rate.

In an aspect, the publishing device can determine one or more data layers comprising published data requested to send on a transmission path. The transmission path can provide directions for transmission of the plurality of data layers through a plurality of devices to a requesting device for the plurality of data layers. In other words, the transmission path is a route for data to take to a destination. The publishing device can utilize adaptive/multiple bit rate streaming to generate/distribute the one or more data layers. In an aspect, the one or more data layers can be encoded using an additive method (e.g., scalable video coding (SVC)). For example, the one or more data layers can comprise a base layer upon which one or more enhancement layers can be stacked to further enhance the quality of the underlying data. The base layer can comprise minimum quality data. The enhancement layers can each serve one or more purposes. For example, some enhancement layers can be used to boost the quality of the underlying data (e.g., increase resolution to make video progressively larger and clearer). Other enhancement layers can be a "frame rate" layer, which can increase frame rate based on bandwidth availability. Any number of enhancement layers can be used. In an aspect, a particular enhancement layer can be decoded if the base layer and any intervening enhancement layers have been received/decoded. To determine the data layers needed to satisfy a request, the publishing device can process the viewing parameters of the one or more requesting devices. The number of data layers created can depend on which of the one or more requesting devices have inclusive viewing parameters or inclusive ranges of viewing parameters. Separate data layers can be created for the requesting devices that have mutually exclusive viewing parameters. A data layer for the requesting devices that have inclusive viewing parameters can be created for the inclusive portion of the viewing parameters and transmitted to the requesting devices sharing those viewing parameters.

The one or more data layers that comprise the published data can be sent by the publishing device to one or more intermediary devices on one or more transmission paths. The one or more intermediary devices can be referred to as intermediary because the one or more data layers can pass through the one or more intermediary devices to reach a requesting device. In an aspect, the one or more intermediary devices can also be requesting devices. The one or more transmission paths can be determined by the publishing device (or any other device as needed) based on the viewing parameters of some or all requesting devices in the network, transmission parameters of intermediary devices in the network, and/or transmission parameters of the publishing device, for example. Transmission parameters can comprise, for example, processing resources, transcoding resources, network resources, established links between devices, network bandwidth rating associated with each link, packet loss metrics associated with each link, latency, battery life, and the like.

In an aspect, different least cost routing methods can be used to determine the one or more transmission paths. In an aspect, different metrics can be emphasized to determine the one or more transmission paths based on whether a multicast or unicast environment is employed. For example, in multicast video distribution, metrics such as packet loss, throughput, latency, and the like can be used. In contrast, a unicast photo distribution environment might not consider packet loss.

In another example, when determining a transmission path, the publishing device can determine other devices on the network that are requesting the published data by receiving other requests from other requesting devices. The publishing device can determine that a transmission path through those other requesting devices to the requesting device is a more optimal path than through a path that has the least number of intermediary devices between the requesting device and the publishing device. In another example, the publishing device might not be able to encode the data for to satisfy the viewing parameters of a particular requesting device because it does not have a codec to meet the viewing parameters. Therefore, the publishing device can create a transmission path that includes an intermediary device in the network that can encode the published data for the requesting device.

After the publishing device determines a transmission path for the one or more data layers, the publishing device can transmit the one or more data layers to a first intermediary device. The first intermediary device can receive the one or more data layers from the publishing device. The first intermediary device can also receive transmission parameters, viewing parameters of the requesting devices on the network, and/or the transmission path. The first intermediary device can select the one or more data layers to send to one or more second intermediary devices and transmit the one or more data layers to the one or more second intermediary devices based on one or more of the transmission path, viewing parameters of the requesting devices on the transmission path, transmission parameters, changes in the network's configuration, and the like.

For example, the first intermediary device might receive first, second, and third data layers. In the event that a downstream requesting device is limited to use of the first data layer, the first intermediary device can be configured to transmit only the first data layer to the downstream requesting device. In an aspect, the first intermediary device, can decode a number of the data layers received based on viewing parameters of the first intermediary device (e.g., first and second data layers) and can render the published data accordingly. Then, the first intermediary device can transmit one or more of the data layers to one or more second intermediary devices, even if the first intermediary device did not utilize all of the one or more data layers to render the published data. The one or more data layers can continue through intermediary devices on the transmission path until received by the requesting device. When received, the requesting device can decode the one or more data layers of the published data requested. The requesting device can decode a number of the one or more data layers (e.g., first, second, and third data layers) based on the viewing parameters of the requesting device.

In an example of video distribution, FIG. 1 illustrates a block diagram of a network configuration of a network 100 that has been created to support content (e.g., video) publication in a theatrical setting. The network configuration can be for multiple bit rate (MBR) video distribution. A device 108 might have an obstructed view of a stage and thus would not be an ideal choice for publication of data. The devices 102-106 might have a view of the stage and particularly of an actor 112. In an aspect, the devices 102, 104, 106, and 108 can be, for example, a computer, a smartphone, a laptop, a tablet, a display device, a camera, a microphone, a mobile device, a communications terminal, a data sensor, a wearable device, or other device capable of communicating with other devices. The solid lines connecting the devices 102-108 illustrate a plurality of links 120-128, along with a network band width rating associated with each link (on a scale of 1-10). A packet loss metric can also be associated with each link.

In the event that the devices 102, 104, and 108 want to subscribe to the content published by the device 106, the devices 102, 104, and 108 first inform the device 106 and pass viewing parameters such as minimum, maximum, and recommended video resolution (based partially on screen size), video bit rate, video codec, audio bit rate, and audio codec. Based on transmission parameters (e.g., CPU, transcoding, and network) the device 106 can determine one or more data layers to transmit. This is based on attempting to provide a least amount of data layers while meeting the needs of the most number of devices.

For example, the device 108 can be a phone that can accept resolutions from 240 p-320 p and at bit rates from 200 kbps-1200 kbps. The device 104 can be a large screen tablet that can accept resolutions from 480 p-1080 p and at bit rates from 2000 kbps-5000 kbps. The device 102 can be a phone that can accept resolutions from 320 p-720 p and at bit rates from 1000 kbps-3000 kbps.

From this information (viewing parameters) the device 106 can determine that two layers will best serve the devices 102, 104, and 108 without over burdening the resources of the device 106. The device 106 can select a data layer of 320 p at 700 kbps that serves the device 108 and a data layer of 720 p at 3000 kbps that serves the devices 102 and 104. A scalable video codec (SVC) can be used to compress the data to a base layer of 320 p at 700 kbps, with an enhancement layer of around 3500 kbps. The devices 102 and 104 can download the base layer and the enhancement layer, which the devices 102 and 104 can use to decode 3000 kbps video, and the device 108 can download the base layer to decode 700 kbps video. This avoids having to transmit two independent feeds of 700 kbps and 3000 kbps, and saves bandwidth.

Furthermore, the device 106 can determine a more optimal route for this distribution. For example, the device 106 can determine to transmit both layers to the devices 102 and 104. The device 104 can then be configured to relay only the base layer to the device 108.

Figure 2:
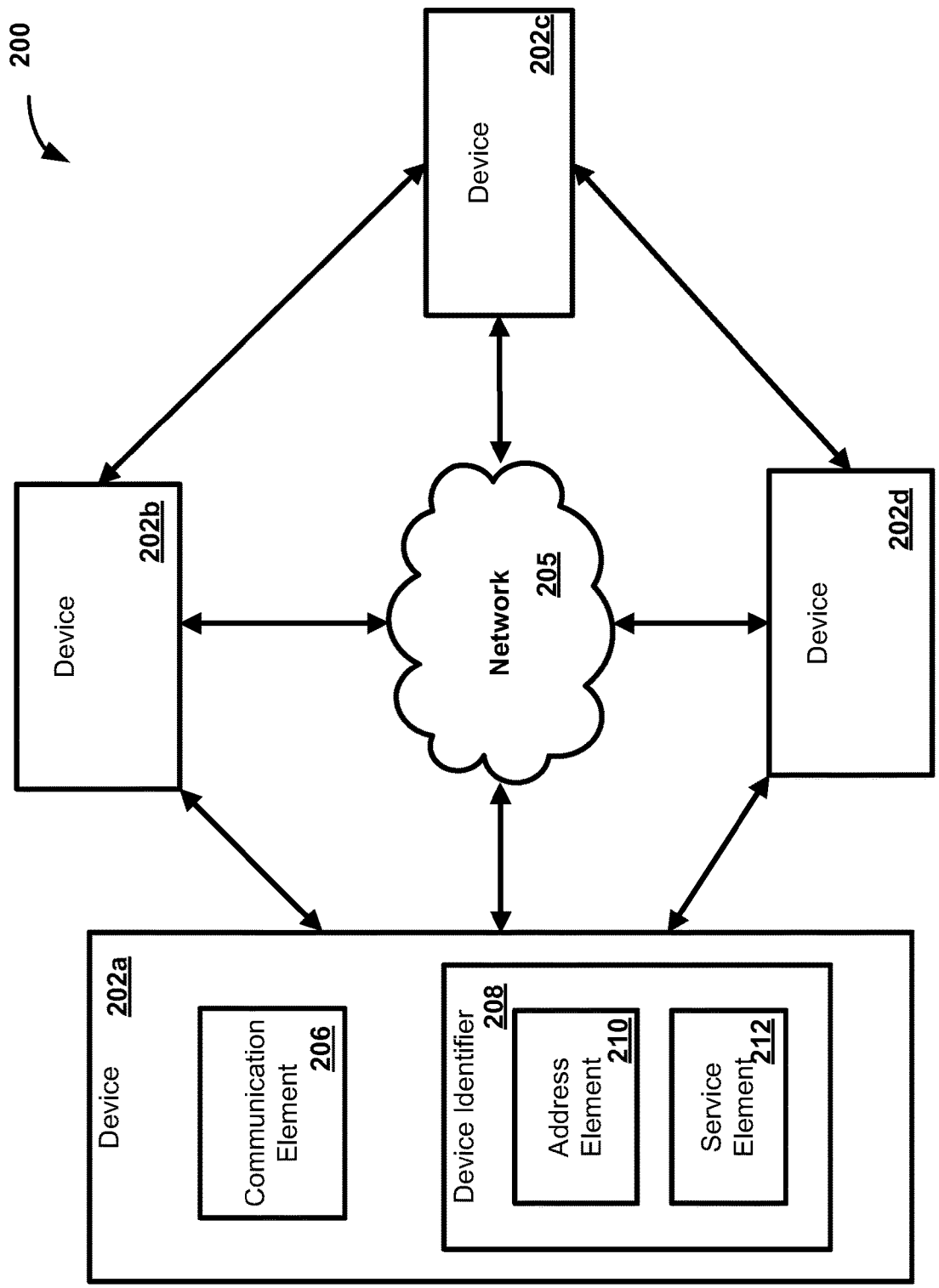
FIG. 2 is a block diagram of an example network.

In an aspect of the disclosure, a network can be configured to provide data publication and distribution to a device. FIG. 2 illustrates an aspect of an exemplary environment in which the present methods and systems can operate. The present disclosure is relevant to systems and methods for publishing and distributing data to and from devices in a network, for example, a device such as a computer, a tablet, a mobile device, a communications terminal, or the like. In an aspect, a system 200 can comprise devices that form an ad-hoc network. In an aspect, one or more devices can be configured to publish/distribute data to one or more devices, such as devices located at or near a premises. In another aspect, the devices can be configured to recognize an authoritative device for the premises and/or a particular service or services available at the premises or for network architecture management. As an example, an authoritative device can be configured to govern or enable connectivity to a network such as the Internet or other remote resources, provide address and/or configuration services like DHCP, and/or provide naming or service discovery services for a premise, or a combination thereof. Those skilled in the art will appreciate that present methods can be used in various types of networks and systems that employ both digital and analog equipment. One skilled in the art will appreciate that provided herein is a functional description and that the respective functions can be performed by software, hardware, or a combination of software and hardware.

The system 200 can comprise a device 202a in communication with other devices 202b,c,d. Examples of devices 202a,b,c,d (collectively referred to as device 202 herein) can be an electronic device such as a computer, a smartphone, a laptop, a tablet, a set top box, a display device, a camera, a microphone, a mobile device, a communications terminal, a data sensor, a wearable device, or other device capable of communicating with other devices. The devices 202b,c,d can be disposed locally relative to the device 202a. As an example, the devices 202 can be in communication via a private and/or public network 205 such as the Internet or a local area network. Other forms of communications can be used such as wired and wireless telecommunication channels, for example.

The device 202a can comprise a communication element 206 for providing an interface to a user to interact with the device 202a and/or other devices 202b,c,d. The communication element 206 can be any interface for presenting and/or receiving information to/from the user, such as user feedback. An example interface may be communication interface such as a web browser (e.g., Internet Explorer®, Mozilla Firefox®, Google Chrome®, Safari®, or the like). Other software, hardware, and/or interfaces can be used to provide communication between the user and one or more of the devices 202. An example of an interface can be a data distribution module 706 of FIG. 7. An example of an interface for the data distribution module is illustrated on a mobile device 800 of FIG. 8. As an example, the communication element 206 can request or query various files from a local source and/or a remote source. As a further example, the communication element 206 can transmit data to a local or remote device such as the other devices 202b,c,d.

In an aspect, the device 202a can be associated with a user identifier or device identifier 208. As an example, the device identifier 208 can be any identifier, token, character, string, or the like, for differentiating one user or device (e.g., device 202a) from another user or device (e.g., device 202b,c,d). In a further aspect, the device identifier 208 can identify a user or device as belonging to a particular class of users or devices. As a further example, the device identifier 208 can comprise information relating to the device 202a such as a manufacturer, a model or type of device, a service provider associated with the device 202a, a state of the device 202a, a locator, and/or a label or classifier. Other information can be represented by the device identifier 208.

In an aspect, the device identifier 208 can comprise an address element 210 and a service element 212. In an aspect, the address element 210 can comprise or provide an internet protocol address, a network address, a media access control (MAC) address, an Internet address, or the like. As an example, the address element 210 can be relied upon to establish a communication session between the device 202 and the other devices 202b,c,d or other devices and/or networks. As a further example, the address element 210 can be used as an identifier or locator of the device 202a. In an aspect, the address element 210 can be persistent for a particular network.

In an aspect, the service element 212 can comprise an identification of a service provider associated with the device 202a and/or with the class of the device 202a. The class of the device 202a can be related to a type of device, capability of device, type of service being provided, and/or a level of service (e.g., business class, service tier, service package, etc.). As an example, the service element 212 can comprise information relating to or provided by a communication service provider (e.g., Internet service provider) that is providing or enabling data flow such as communication services to the device 202a. As a further example, the service element 212 can comprise information relating to a preferred service provider for one or more particular services relating to the device 202a. In an aspect, the address element 210 can be used to identify or retrieve data from the service element 212, or vice versa. As a further example, one or more of the address element 210 and the service element 212 can be stored remotely from the device 202a and retrieved by one or more devices such as the devices 202a,b,c,d. Other information can be represented by the service element 212.

In an aspect, the devices 202 can comprise an ad-hoc network. The ad-hoc network can be a mobile ad-hoc network (MANET). In an aspect, the system 200 comprised of the devices 202 can be a wireless mesh network (WMN). An aspect of the system 200 herein will be illustrated with respect to a MANET, however it should be understood that aspects herein can be used in any network.

In an aspect, a MANET can be formed when a plurality of devices 202 such as wireless mobile devices are in proximity to one another. Domain name system (DNS) redirection and quick response (QR) codes, for example, can be used to direct the devices 202 to the same network methods such as, but not limited to, Bluetooth/Bluetooth low energy (BLE) beacons, and near-field communication (NFC). In an aspect, once the system 200 is established, the devices 202 can use broadcast or multicast discovery tools to establish functional network services for data sharing such as universal plug and play (UPnP) and Bonjour.

In an aspect, once the devices 202 have created the system 200 and discovered each other, the devices 202 can share data between each other. The data shared can be, for example, published data, which can be data such as video data, audio data, a picture, text, sensor data, an animation, and the like. The published data can be generated real-time data and/or stored data. The published data can further comprise device data describing capabilities of the device such as viewing parameters and transmission parameters, for example. A device can manage what data specific to the device is available to other devices on the system 200. For example, a device, such as device 202a, can select which data the device 202a wants to publish and make available to other devices of the system 200. In an aspect, the devices 202 can share a common data distribution engine, such as a data distribution module 706 of FIG. 7.

In an aspect, the data can be published by the devices 202. The data a device publishes can be, but is not limited to, data such as video and audio data, and device data such as a viewing parameter and transmission parameters. Publishing can be accomplished by sending indicators to the other devices on the system 200. The indicators indicate published data is available and information about the published data. Once the data is published by the devices 202, then the devices 202 can view available published data from which to request. The received indicators can provide information about the published data to let the users of the devices 202 know what the published data comprises. Examples of an indicator that provides information about the published data can be a text description, an image, a device location, an audio clip, and the like.

In an aspect, a device of the devices 202 can request data (a requesting device) by selecting desired published data, such as video data and audio data, from another device (a publishing device) of the devices 202 based on an indicator. In an aspect, the requesting device can determine a transmission path through the devices 202 of the system 200 to the publishing device. In an aspect, the transmission path can be based on one or more transmission parameters associated with the devices 202. In an aspect, the transmission parameters can be, for example, one or more of, network resources, processor resources, transcoding resources, established links between devices 202, network bandwidth rating associated with each link, packet loss metrics associated with each link, latency, battery life, and the like. In an aspect, the transmission path can be a path for sending a request for published data to the publishing device from the requesting device through one or more of the devices 202.

In an aspect, the requesting device can transmit a request to the publishing device. The request can comprise a request for the published data selected. The request can also comprise the transmission path for the request to the publishing device. In an aspect, the request can also comprise a viewing parameter and/or a transmission parameter. The viewing parameter can vary for the type of data requested. In an aspect, the viewing parameter can comprise, for example, a range of video resolution, a screen size, a video bit rate, a video codec, an audio bit rate, an audio codec, a frame rate, a color space, an accessibility feature, closed captioning, and the like.

In an aspect, the requesting device can transmit the request to an intermediary device on the transmission path of the devices 202 from the requesting device to the publishing device. In another aspect, the requesting device can transmit the request to all intermediary devices linked to the requesting device. In an aspect, an intermediary device that receives the request can determine whether the published data requested is already being received by the intermediary device. If the published data requested is already being received by the intermediary device, then the intermediary device can end the transmission path for the request to the publishing device and perform functions of the publishing device described herein. The intermediary device can provide the published data requested to the requesting device.

In an aspect, the publishing device can receive the request and the viewing parameter from the requesting device (or from any device on the network). The publishing device can then determine a transmission path on which to transmit the published data requested based on the viewing parameter and/or transmission parameter. In an aspect, the publishing device can receive a plurality of requests from one or more of the plurality of devices 202 for the same data requested by the requesting device. In another aspect, the plurality of requests can be for different published data. The plurality of requests can comprise a viewing parameter and/or transmission parameter for each requesting device. In an aspect, the publishing device can determine a transmission path for the published data based on one or more of the viewing parameter and/or transmission parameter received. In an aspect, each requesting device can have different viewing parameter and/or transmission parameters requiring separate data feeds. The publishing device can determine and generate one or more data layers comprising the published data requested based on the viewing parameter and/or transmission parameter. The data layers can be combined together and transmitted in a single feed.

In an aspect, the one or more data layers can represent separate data feeds to different requesting devices for the same data but with different viewing parameters. For example, if the viewing parameters of requesting devices comprise a range of resolutions and bit rates, the publishing device can determine the one or more data layers based on the viewing parameters by determining whether the viewing parameters for each requesting device are inclusive or exclusive of each other. Viewing parameters that are exclusive can mean that none of the viewing parameters are the same between at least two requesting devices. Viewing parameters that are inclusive can mean that at least a portion of the viewing parameters are the same between two or more devices.

For example, if a first requesting device and a second requesting device have a respective first and second video resolution range and respective first and second bit rates that are mutually exclusive, then a respective first and second data layer can be created for each requesting device. If a third requesting device has a third resolution range and a third bit rate that is partially inclusive of one of the first and second requesting devices then the publishing device can create a data layer for the two devices with the viewing parameters that are inclusive of each requesting device. The publishing device can utilize adaptive/multiple bit rate streaming to generate/distribute the one or more data layers. In an aspect, the one or more data layers can be encoded using an additive method (e.g., scalable video coding (SVC)). For example, the one or more data layers can comprise a base layer upon which one or more enhancement layers can be stacked to further enhance the quality of the underlying data. The base layer can comprise minimum quality data. The enhancement layers can each serve one or more purposes. In an aspect, an intermediary device on the transmission path can encode the published data for the partially inclusive requesting devices. A plurality of data layers can be used to avoid having to transmit independent feeds and can conserve bandwidth.

In an aspect, the publishing device can transmit the one or more data layers to a first intermediary device on the transmission path. In an aspect, the publishing device can also transmit transmission parameters, the transmission path, and requested viewing parameters to the first intermediary device. The first intermediary device on the transmission path can determine, based on the transmission path, transmission parameters, and viewing parameters, one or more second intermediary devices to send the one or more data layers. Furthermore, the first intermediary device can determine from the transmission path, transmitting parameters, and viewing parameters which of the one or more data layers to send to the one or more second intermediary devices. If the first intermediary device is also a requesting device, then the first intermediary device can also determine which of the one or more data layers can be presented locally. The one or more data layers can continue through intermediary devices along the transmission path until received by the requesting device. When received, the requesting device can decode the one or more data layers of the published data requested. The requesting device can decode a number of the one or more data layers (e.g., first, second, and third data layers) based on the viewing parameters of the requesting device.

Figure 3:
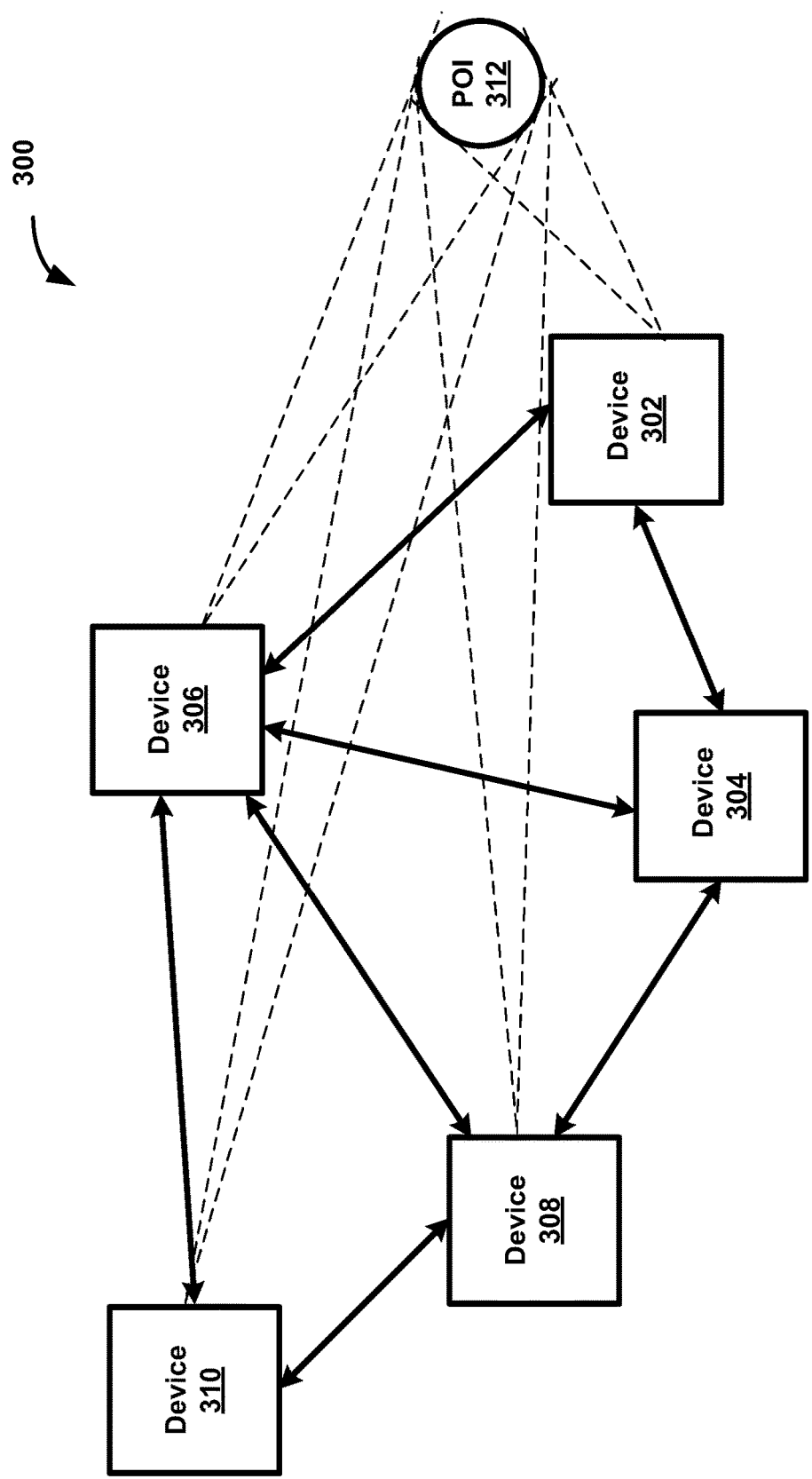
FIG. 3 is a block diagram of an example system.

In an aspect, FIG. 3 illustrates an example network in which systems and methods of data publication and distribution described herein can be used. The network 300 can comprise a plurality of devices 302, 304, 306, 308, and 310, such as devices 202 of FIG. 2. However, in an aspect, the network 300 can comprise any number of devices. In an aspect, devices can be dynamically changing connections between one another and coming in and out of the network 300.

In an aspect, the devices 302, 304, 306, 308, and 310 can be communicatively coupled with each other. In an aspect, a device can be communicatively coupled to another device in the network 300 through an intermediary device. For example, the device 308 can be in communication with the device 302 through the device 304 and the device 306. In an aspect, the devices 302-310 of the network 300 can be in communication with each other through a wireless connection. The devices 302-310 can be mobile wireless devices, static wireless devices, or a combination of both. In an aspect, the network 300 of the devices 302-310 can be a mobile ad-hoc network (MANET). In an aspect, the network 300 comprised of the devices 302-310 can be a wireless mesh network (WMN). An aspect of the network 300 herein will be illustrated with respect to a MANET, however it should be understood that aspects herein can be used in any network.

In an aspect of FIG. 3, an example where the network 300 can be formed is at an event where one or more points of interest (POIs) 312 can be observed by the devices 302-310 and users of those devices 302-310. The dashed lines in FIG. 3 represent the line of sight each device 302-310 has to the POI 312. Examples of an event include, but are not limited to, a concert, a sporting event, a race, a play, a speaking engagement, and the like. In an aspect, the data being published by any of the devices 302-310 can be generated data such as images, video, sensor, text and/or audio data of the POI 312. In an aspect, the published data can be stored data and/or real-time data. In an aspect, some of the devices 302-310 can have a better view of the POI 312 than others. For example, the device 302 can be in a better location than the device 310 because the device 302 is closer to the POI 312. In an aspect, the device (publishing device) 302 can publish data such as video and/or audio data of the POI 312.

Figure 7:
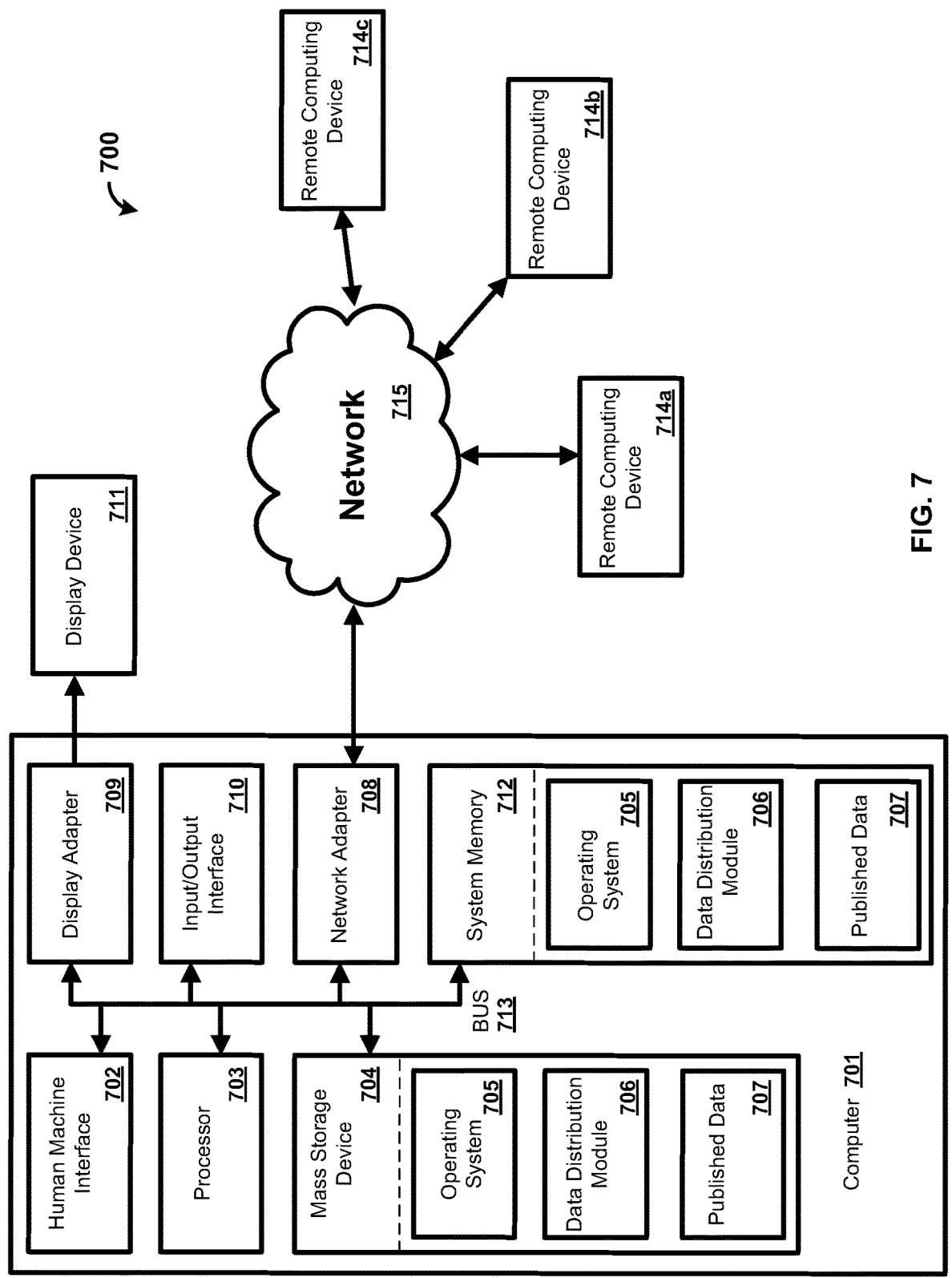
FIG. 7 is a block diagram of an example computer system.

In an aspect, the publishing device 302 can publish images, video and/or audio data to the network 300 to be available to the other devices 304, 306, 308, and 310. In an aspect, the publishing device 302 can publish the data using the data distribution module 706 (FIG. 7). In an aspect, the publishing device 302 can send out an indicator to the other devices 304-310 on the network 300 that provides information about the published data so the devices 304-310 can make a decision based on the information, whether to select the publishing device 302 or not. The information, for example, can be location information of the publishing device 302; type of data being recorded or stored in the form of text, images, and audio; quality of the published data; quality of network resources available; combinations thereof and the like.

Figure 8:
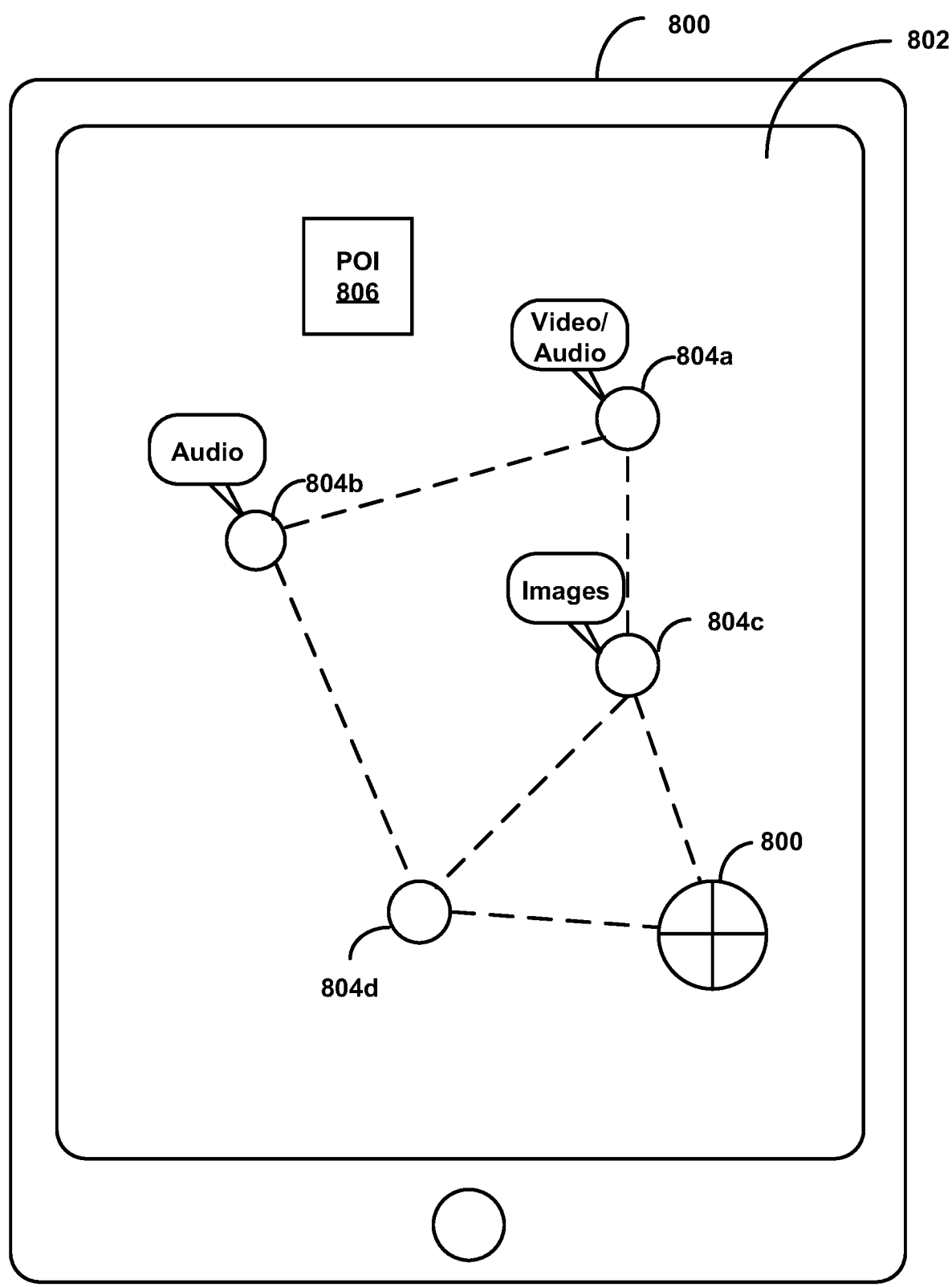
FIG. 8 is a block diagram of an example user interface.

An example of an interface for viewing the information can be seen in FIG. 8. FIG. 8 illustrates a mobile device 800 such as the devices 202 of FIG. 2. The mobile device 800 can include an interface 802 for interacting with the data distribution module 706 of FIG. 7. The interface 802 can be configured to display locations of devices 804a,b,c,d on a network, how the devices 804a,b,c,d are connected to one another, and a relation of the mobile device 800 to the devices 804a,b,c,d. The interface 802 can display the location of the devices 804a,b,c,d in relation to the point of interest 806. The information provided by publishing devices such as devices 804a,b,c can be displayed for a user of the mobile device 800 so that the user can determine from which of devices 804a,b,c to request published data. For example, a callout can appear from each publishing device 804a,b,c stating the type of published data the device 804a,b,c is producing. The user of mobile device 800 can select the publishing device from which the user wants to request published data by inputting a command through a touchscreen, voice activation, a mouse, a stylus, a text command, and the like.

Referring back to FIG. 3, in an aspect, the device (requesting device) 310 can select to view the POI 312 from the perspective of another device in the network 300. The requesting device 310 can display an interface, such as the interface 802 of FIG. 8, of the data distribution module 706 of FIG. 7 to determine which devices 302-308 are publishing data. The requesting device 310 can receive indicators that one or more publishing devices, such as the publishing device 302, are sending out on the network 300. In an aspect, the data distribution module 706 can provide on the interface 802 the devices 302-308 in a hierarchal format based on the information in the indicator. For example, the publishing device with the best transmission parameters can be listed first or the publishing devices can be displayed based on location, where the closest publishing device to the POI 312 is listed first. Other examples of the hierarchal format can be based on codec supported, frame rate, color space, bit rate, and the like of the publishing devices.

In an aspect, the requesting device 310 can receive a selection for a publishing device from which to request and receive data. For example, the device 310 can receive a selection to request data from the publishing device 302 because it is the closest device on the network 300 to the POI 312. In an aspect, a user of the requesting device 310 can make the selection through the interface, such as the interface 802.

In an aspect, the requesting device 310 can determine a transmission path through the devices 304, 306, and 308 to the publishing device 302 on which to send a request for the published data. The transmission path for the request can be determined based on transmission parameters of the devices 304, 306, and 308 connecting the publishing device 302 to the requesting device 310. For example, the requesting device 310 can determine that a transmission path for sending a request is best sent through the device 306 because the device 306 can provide a shortest transmission path. In an aspect, the requesting device 310 can determine that the transmission path for sending a request for data to the publishing device 302 is best sent through the device 308 and the device 304 because the devices 304 and 308 have transmission parameters that can send the request faster to the publishing device 302 than through any other possible path or because the devices 304 and 308 want to consume the same data that the device 310 requests. Aspects herein should not be limited to determining the transmission path based on the most efficient path from the requesting device to the publishing device as any possible path can be determined and used.

In an aspect, after the requesting device 310 determines a transmission path on which to send a request to the publishing device 302, the requesting device 310 can transmit the request for the published data to a first intermediary device, such as device 306, on the transmission path. The first intermediary device 306 can then forward the request to the publishing device 302 for the published data. In an aspect, the request can comprise a requested parameter such as a viewing parameter in an example where the data is video. Viewing parameter can comprise a range of video resolution, screen size, video bit rate, video codec, audio bit rate, audio codec, frame rate, color depth, and the like. For example, the viewing parameters of the requesting device 310 can be: 1"×1" screen, accepts a resolution from 240 p-320 p, and accepts bit rates from 200 kbps-1200 kps. In an aspect, the devices 302-310 can act as one or more of a publishing device, a requesting device, and an intermediary device on a transmission path simultaneously.

In an aspect, the requesting device 310, can link to as many devices (such as devices 306 and 308) as possible and can send a request for the published data to the linked devices 306 and 308 along with the viewing parameters. Each linked device 306 and 308 receiving the request can determine whether it is either consuming the published data requested or transmitting the published data to another device. If one of the linked devices 306 and 308 is already receiving the published data, it can perform functions of a publishing device as described herein for transmitting the published data requested to the requesting device 310.

In an aspect, if there are multiple linked devices that are receiving the published data requested and none of the linked devices supports a throughput the requesting device 310 requires, then the requesting device 310 can receive feedback that none of the linked devices can support the viewing parameters. Then, the requesting device 310 can send requests to the linked devices for partial published data from each linked device receiving the published data. For example, if one linked device does not support the viewing parameters requested by the requesting device 310, then the requesting device 310 can request data layers 1-2 from a first linked device, data layer 3 from a second linked device, and data layers 4-5 from a third linked device. However, decoding data layer 5 can be problematic because the requesting device 310 must decode data layers 1-4 along with data layer 5. Losing bytes of data from the data layers 1-4 can result in error when trying to decode data layer 5. In an aspect, additional forward error correction can be used or a backup link device can be ready in case any bytes from an earlier data layer are lost.

In an aspect, the linked devices can keep track of the requesting devices receiving data from them and the transmission parameters the linked devices need to send the data. The linked devices can communicate this information to the publishing device such as publishing device 302. This allows the publishing device 302 to allocate transmission parameters for transmitting published data requested to linked devices of the publishing device 302 where transmission parameters are needed most. In an aspect, more devices can be linked to the publishing device 302 if the transmission parameters of the linked devices are getting overwhelmed. In an aspect, if more devices cannot be linked to the publishing device 302, then linked devices can be converted into repeaters/transcoders to consolidate the one or more data layers being sent out by the publishing device 302.

In an aspect, there are situations where the requesting device 310 transmits a request for data through a transmission path to the publishing device 302 instead of transmitting a request to all of the linked devices linked to the requesting device 310. In these situations, once a first intermediary device 306 (which can be a linked device or vice versa) on the transmission path receives the request and the transmission path from the requesting device 310, the layout of the network can change. For example, the network can change because of movement of devices in the network. Devices can be added and/or removed from the network, move relative to other devices (affecting network connections), and the like. Therefore, the transmission path to the publishing device 302 may no longer exist. Based on the request and the transmission path received, the first intermediary device 306 can recalculate the transmission path to the publishing device 302. For example, a link between the first intermediary device 306 and the device 308 can be broken but a link between the first intermediary device 306 and the device 304 can still exist. The first intermediary device 306 can create a new transmission path and send the new transmission path and the request for the published data to the device 304, which can be a second intermediary device 304. The second intermediary device 304 can then send the request to the publishing device 302.

In an aspect, after the request is sent from the requesting device 310 and received by the publishing device 302, the publishing device 302 can determine a transmission path by which to send the published data. The transmission path can be a path from the publishing device 302 through the devices 304, 306, and 308 to the requesting device 310. In an aspect, a data distribution module 706 of FIG. 7 as part of the communication element 206 of FIG. 2 can determine the transmission path. The transmission path can be determined from one or more viewing parameters of the requesting device 310, transmission parameters of the devices 304, 306, and 308, and the like.

In an aspect, one or more of the devices 304, 306, and 308 can be a requesting device like requesting device 310 and transmit a request to the publishing device 302. In an aspect, the requests from the devices 304, 306, and 308 can include a viewing parameter from each device 304, 306, and 308. When determining the transmission path from the publishing device 302 to the requesting device 310, the publishing device 302 can use transmission parameters of the devices 304-310 and the viewing parameters of each requesting device in determining the transmission path. In an aspect, the publishing device 302 can determine the transmission path from the publishing device 302 to the requesting device 310 through other requesting devices 304, 306, and 308.

In an example, the device 304 and the device 306 can request the same data from the publishing device 302 as is requested by the requesting device 310. The device 304 can be a smart phone that can comprise viewing parameters of 320 p-720 p resolution and a bit rate of 1000 kbps-3000 kbps. The device 306 can be a large screened tablet that can comprise viewing parameters of 480 p-1080 p resolution and a bit rate of 2000 kbps-5000 kbps.

In an aspect, once the publishing device 302 determines the transmission path through the one or more devices 304-308 to the requesting device 310. Then the publishing device 302 can generate one or more data layers. The data layers can comprise the published data requested. The one or more data layers can be determined based off of the viewing parameters of the one or more requesting devices 304-310. A data layer can represent an encoded feed of the published data that is compatible with viewing parameters of a requesting device 310. Data layers can allow published data to be transmitted to multiple requesting devices that have different viewing parameters in a single feed rather than producing multiple feeds for each request of the data. The publishing device 302 can utilize adaptive/multiple bit rate streaming to generate/distribute the one or more data layers. In an aspect, the one or more data layers can be encoded using an additive method (e.g., scalable video coding (SVC)). For example, the one or more data layers can comprise a base layer upon which one or more enhancement layers can be stacked to further enhance the quality of the underlying data. The base layer can comprise minimum quality data. The enhancement layers can each serve one or more purposes. For example, some enhancement layers can be used to boost the quality of the underlying data (e.g., increase resolution to make video progressively larger and clearer). Other enhancement layers can be a "frame rate" layer, which can increase frame rate based on bandwidth availability. Any number of enhancement layers can be used. In an aspect, a particular enhancement layer can be decoded if the base layer and any intervening enhancement layers have been received/decoded. Furthermore, the data layers can be created based on which viewing parameters are mutually exclusive and which viewing parameters are inclusive of each other.

Returning to the example of the devices 304, 306 and requesting device 310 requesting the published data from the publishing device 302, the device 302 can determine from the respective viewing parameters of the devices 304, 306, and requesting device 310 that two data layers will best serve the requesting devices. A first (base) data layer can be 320 p at 700 kbps to serve the requesting device 310. A second (enhancement) data layer can be 720 p at 3000 kbps to serve the devices 304 and 306.

In an aspect, a scalable video codec (SVC) can be used to encode the published data requested at a resolution of 320 p and at a bit rate of 700 kbps for the first (base) data layer. The SVC can also be used to encode the second data layer, which can be an enhancement data layer, at a resolution of 720 p and a bit rate of approximately 2500 kbps. Encoding the data can allow the device 304 and the device 306 to receive both data layers, which the device 304 and the device 306 can use to decode the equivalent 3000 kbps data layer. Furthermore, the requesting device 310 can receive the first data layer to decode the 700 kbps data layer. Compressing the data using a technique similar to SVC can help avoid having to transmit two independent feeds of 700 kbps and 3000 kbps and saves bandwidth.

In an aspect, the data distribution module 706 of publishing device 302 can determine the transmission path of the first data layer and the second data layer. Furthermore, the publishing device 302 can generate a third data layer. Based on the viewing parameters of the requesting devices, transmission parameters of the publishing device 302, transmission parameters of other devices on the network, and the like, the publishing device 302 can determine more than one transmission path. Each transmission path can transmit one or more of the generated data layers. An example first transmission path can be: the publishing device 302 transmitting the first and second data layers to the device 304 and the device 306; then the device 306 relaying the first data layer to the requesting device 310. An example second transmission path can be the publishing device 302 transmitting the first, second, and third data layers to device 306.

In an aspect, the transmission path can also be sent to the device 304 and the device 306 acting as first intermediary devices. The device 306 can determine that a secondary intermediary device to send the data layers is the requesting device 310. The device 306 can determine this from at least the transmission path, transmission parameters, and the viewing parameters. The device 306 can select the first data layer, based on the viewing parameters of the requesting device 310, and transmit the first data layer to the requesting device 310. When received, the requesting device 310 can decode the first data layer of the published data based on the viewing parameters of the requesting device 310. The device 306 can also determine which data layers it requested and decode one or more of the data layers received. The device 306 and the requesting device 310 can decode and render the published data of the data layers. For example, the video that is being produced by publishing device 302 of the POI 312 can be displayed on each respective visual display of the device 306 and the requesting device 310. In an aspect, the data can be rendered on the visual display of the device 306 and the requesting device 310 in real-time.

In an aspect, the network connection between the device 306 and the requesting device 310 can terminate due to proximity or some other factor. In the case where the ad-hoc network is dynamically changing, the device 306 can recalculate a transmission path for the first data layer for the requesting device 310. In an aspect, the transmission parameters and the viewing parameters of the various devices of the network 300 can be used to recalculate the transmission path by the device 306. In an aspect, the first data layer can be sent again through the publishing device 302 or the device 306 can indicate to the publishing device 302 that the transmission path no longer exists and has to determine another transmission path for the published data requested. As the first data layer is being transmitted to the requesting device 310, the transmission path can be constantly changing due to devices being added, dropped, and/or changed position in the ad-hoc network.

In an aspect, a device of the network 300, such as the device 304, can be a wireless access point. In an aspect, the published data from publishing devices can be available at the access point. All data layers can be available at each access point since the backhaul between access points can be high bandwidth. Access points can be used with dual band devices that allow connections to different devices at different frequencies. For an example, the access point could be a mounted camera with a high quality resolution and an elevated view.

In an aspect, when a requesting device requests data from a publishing device, the request can contain a vote or an action request for the publishing device to adjust the data. For, example, if the publishing device is capturing video and/or audio, then the requesting device, such as the device 310, can vote for the publishing device, such as the device 302, to perform an action such as pan, zoom, and/or reposition the camera. In an aspect, the publishing device 302 can receive multiple votes from multiple requesting devices for the same and different actions. In an aspect, the publishing device 302 can adjust the data based on the most votes for a particular action.

In an aspect, the publishing device 302 can adjust the data based on micro-payments received. The requesting device 310 can submit micro-payments with the request to adjust the data. In an aspect, the most micro-payments received can result in the data being adjusted. In an aspect the micro-payments are only paid out if the action is performed. In an aspect, micropayments can be distributed to those who assist in the maintenance of the network such as relays, transcoders, and publishers as well.

In an aspect, the requesting device 310 can request published data from a plurality of publishing devices, receive the published data from the plurality of publishing devices, and combine the published data. For example, a first publishing device, such as device 306 can have better audio data than a second publishing device 302. In an aspect, the second publishing device 302 can have better video data. The requesting device 310 can request the audio data from the first publishing device 306 and the video data from the second publishing device 302. The requesting device 310 can receive both audio and video data and combine them. In an aspect, video data can have multiple video data layers that can be received from a plurality of publishing devices. The requesting device 310 can receive the multiple data layers and combine them. Likewise, audio data can have a plurality of data layers that can come from a plurality of different publishing devices. In an aspect, a synchronized clock can be maintained by the data distribution module 706 so that the timing of first (audio) data and the second (video) data on a first and second data layer of respective publishing devices 306 and 302 are time stamped using the same clock reference. In an aspect, the requesting device 310 can have a buffer that can align the multiple data layers and play back content using the time reference present in each data layer, so when combined, the audio and video appear to be recorded from the same device.

In an example, if one publishing device does not support the viewing parameters requested by the requesting device 310, then requesting device 310 can request data layers 1-2 from a first publishing device, data layer 3 from a second publishing device, and data layers 4-5 from a third publishing device. However, decoding data layer 5 can be problematic because the requesting device must decode data layers 1-4 as well. This increases the odds that bytes from data layers 1-4 could be lost, resulting in errors when decoding data layer 5. In an aspect, additional forward error correction can be used or a backup publishing device can be ready in case any bytes from an earlier data layer are lost.

In an aspect, the data distribution module 706 of FIG. 7 of a requesting device can comprise motion tracking capabilities of a point of interest (POI) such as POI 312. The data distribution module 706 can determine when the published data requested from a first publishing device no longer has the POI 312 in view and can automatically determine a second publishing device where the POI 312 is now in view. Non-imaging data besides audio and video data that could be requested can be a current speed of the POI 312, a number of times the POI 312 has gone in and out of view, and the like. The requesting device can automatically request the published data from the second publishing device; the second publishing device can determine a transmission path and generate data layers; and transmit the data layers on the transmission path to the requesting device. In an aspect, dedicated publishing devices can be used to publish data relating to a POI 312. The requesting device can select the POI 312 which can be described in an object recognition module. Linked devices to the publishing devices can then be informed when the publishing device is capturing the requested POI 312. If more than one publishing device is capturing the POI 312, then the requesting device can apply a set of rules to determine the publishing device from which to receive the published data. Examples of rules can be a publishing device that is closest to the object, has the highest bit rate, or is a favorite publishing device. When the current publishing device loses view of the POI 312 the requesting device can switch to a publishing device viewing the POI 312.

Figure 4:
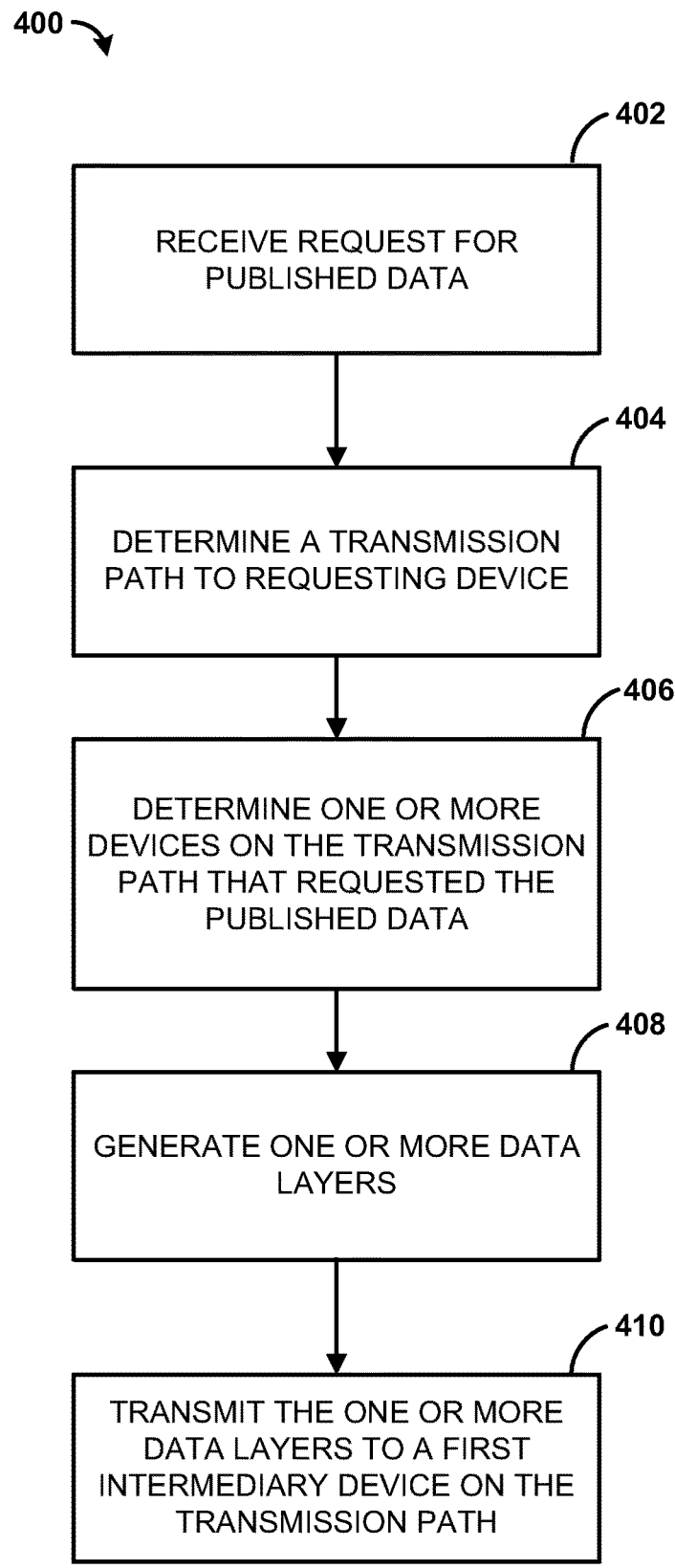
FIG. 4 is a flow chart of an example method.

FIG. 4 illustrates a method 400 for transmitting published data to requesting devices. The method illustrated in FIG. 4 will be discussed in reference to FIGS. 1-3, for example only. In step 402, a publishing device, such as device 302, can receive a request for published data from a requesting device, such as device 310. The request can comprise a viewing parameter. The viewing parameter can contain information about the capabilities of the requesting device such as a range of video resolution, a screen size, a video bit rate, a video codec, an audio bit rate, an audio codec, a frame rate, a color space, an accessibility feature, closed captioning, and the like. The published data can comprise data that the publishing device 302 is providing to devices on a network. The published data can comprise of one or more of audio data, image data, video data, animation data, text data, and the like. The published data can include real-time data, stored data, data generated by another device, and the like. In an aspect, the request can come from a first intermediary device on a transmission path from the requesting device 310 to the publishing device 302.

In step 404, when the request is received, the publishing device 302 can determine a transmission path to transmit one or more data layers to the requesting device 310 through a plurality of devices, such as devices 304-308. The requesting device 310 can be connected to the publishing device 302 through the plurality of devices. The transmission path can be determined based on the viewing parameters and the transmission parameters of the plurality of devices that make up the network and connect the publishing device 302 to the requesting device 310. The transmission parameters can be one or more of, processing resources, transcoding resources, network resources, and the like. For example, the publishing device 302 can determine other devices on the network that are requesting the data from other received requests. The publishing device 302 can determine that a transmission path through those other requesting devices to the requesting device 310 is a more optimal path than through a path that has the least number of devices between the requesting device 310 and the publishing device 302. In another example, the publishing device 302 might not be capable of encoding the data to satisfy the viewing parameters of a particular requesting device 310 because the publishing device 302 might not have a codec to meet the viewing parameters. Therefore, the publishing device 302 can create a transmission path that includes an intermediary device in the network that can encode the published data for the requesting device 310.

In step 406, the publishing device 302 can determine one or more devices (devices 304-308) on the transmission path that have also requested the data. The device 304 and 308 can also have requested the data from the publishing device 302. The one or more devices can each have a respective viewing parameter. Examples of the viewing parameters can be one or more of video resolution, video bit rate, video codec, audio codec, audio bit rate, and the like.

In step 408, the publishing device can generate one or more data layers. The data layers can comprise the requested published data. The data layers can be generated based on the viewing parameters of the requesting device 310 and the one or more devices requesting the data that are on the transmission path to the requesting device 310. The determination of how many data layers are needed can be based off of how many requesting devices are requesting the data and the viewing parameters. From the viewing parameters, the publishing device 302 can determine which requesting devices have mutually exclusive viewing parameters and which requesting devices have at least a partially inclusive viewing parameter. A separate data layer can be generated for each mutually exclusive requesting device and a common data layer can be generated at common viewing parameters for the inclusive requesting devices. The requesting device comprising more extensive viewing parameters than those of other devices requiring a separate data layer can use a combination of more than one data layer to render an output.

In step 410, the publishing device 302 can transmit the one or more data layers to a first intermediary device on the transmission path or multiple transmission paths. In an aspect, the publishing device 302 can transmit the transmission path to the first intermediary device so that the first intermediary device can determine a second intermediary device to send the one or more data layers. The transmission path can be determined based on the transmission parameters of the devices of the network, the viewing parameters of the requesting device 310, other devices requesting the published data, and how much of the published data the requesting devices have requested.

Figure 5:
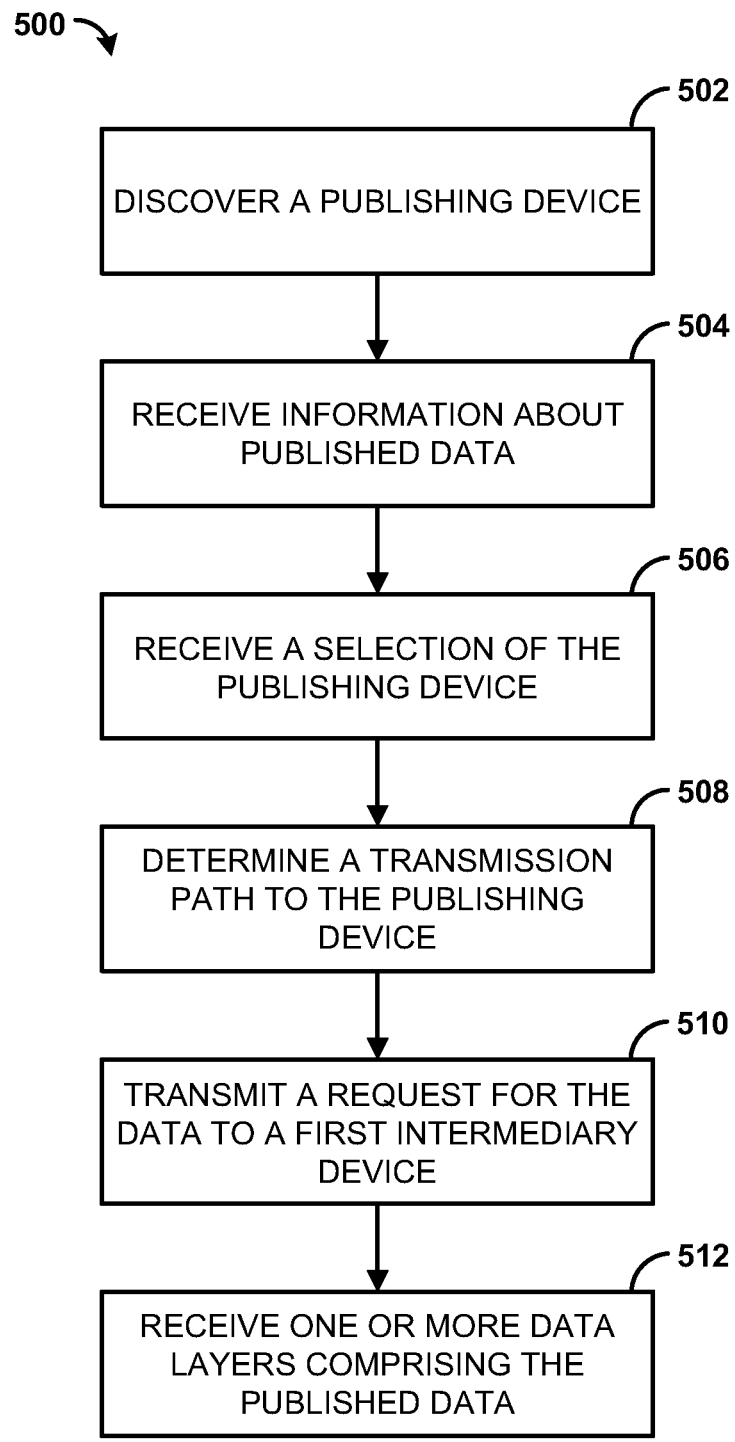
FIG. 5 is a flow chart of an example method.

FIG. 5 illustrates a method 500 for requesting and receiving published data. In step 502, a requesting device, such as device 310, can discover a publishing device, such as device 302 from a plurality of devices, i.e., devices 302-308. In an aspect, the requesting device 310 can join a MANET. A MANET can form when a plurality of devices such as wireless mobile devices are in proximity to one another. Domain name system (DNS) redirection and quick response (QR) codes, for example, can be used to direct the requesting device 310 to the same network methods of the publishing device 302 such as, but not limited to, Bluetooth/Bluetooth low energy (BLE) beacons, and near-field communication (NFC). In an aspect, once the network is established, the requesting device 310 and publishing device 302 can use broadcast or multicast discovery tools to establish functional network services for data sharing such as universal plug and play (UPnP) and Bonjour. The publishing device 302 can generate data and/or can make data available for other devices to access. The data published by the publishing device 302 can be one or more of audio, an image, a video, an animation, text data, sensor data, and the like.

In step 504, the requesting device 310 can receive an indication that provides information about the published data. The indication can include text, an image, a location (i.e. global positioning data) of the publishing device, a video clip, an audio clip, and the like. The indication can be displayed to the user on an interface of the requesting device 310. The interface can include a map of the network with the various locations of the devices 302-308, how the devices are connected, and any published data that a particular device is publishing. Based on the indications on the interface the user can select a publishing device to request published data. The user of the requesting device 310 can select the publishing device 302, from which the user wants to request data, by inputting a command.

In step 506, the requesting device 310 can receive a selection of the publishing device 302. The selection indicates which publishing device to send a request for data. The selection can be performed by a user of the requesting device 310. The user can provide an input to the device in the form of a touch command, a voice command, text, a mouse selection, and the like through the interface.

In step 508, the requesting device 310 can determine a transmission path through a plurality of devices to the publishing device 302. The transmission path can be determined based on one or more transmission parameters associated with the plurality of devices. The requesting device 310 can determine the transmission path based on which devices of the network are connected to each other. In an aspect, the requesting device can determine a transmission path for the request for published data through the least number of devices between the requesting device 310 and the publishing device 302. In an aspect, the requesting device 310 can determine multiple transmission paths for the request. Sending multiple requests to other linked devices can allow the linked devices to determine whether or not they are currently receiving the published data from the publishing device 302. If one or more linked devices are receiving the published data at the viewing parameters, then the one or more linked devices can transmit the data layers containing the published data to the requesting device 310. The request does not need to proceed to the publishing device 302.

In step 510, based on the selection, the requesting device 310 can transmit a request for the published data to the publishing device 302. The request can be transmitted through the transmission path. The request can also include a viewing parameter, which describes the capabilities of the requesting device 310. Examples of parameters in the viewing parameter can be one or more of video resolution, video bit rate, video codec, audio codec, audio bit rate, and the like. The requesting device 310 can transmit the request to an intermediary device on the transmission path to the publishing device 302. The publishing device 302 can receive the request from the intermediary device or a second intermediary device that is on the transmission path. In an aspect, the transmission path can be sent with the request. If a connection in the transmission path goes down, the transmission path can be recalculated by any intermediary device that is on the transmission path that has the request and transmission path.

In step 512, the requesting device 310 can receive one or more data layers. The one or more data layers can comprise the requested published data from the publishing device 302. The requesting device 310 can receive the data from an intermediary device on the transmission path for sending the published data determined by the publishing device 302. In an aspect, the intermediary device can relay the one or more data layers from the publishing device 302. In an aspect, the requesting device 310 can render the data from the one or more data layers. For example, the requesting device can render video data from a publishing device that is filming a point of interest.

Figure 6:
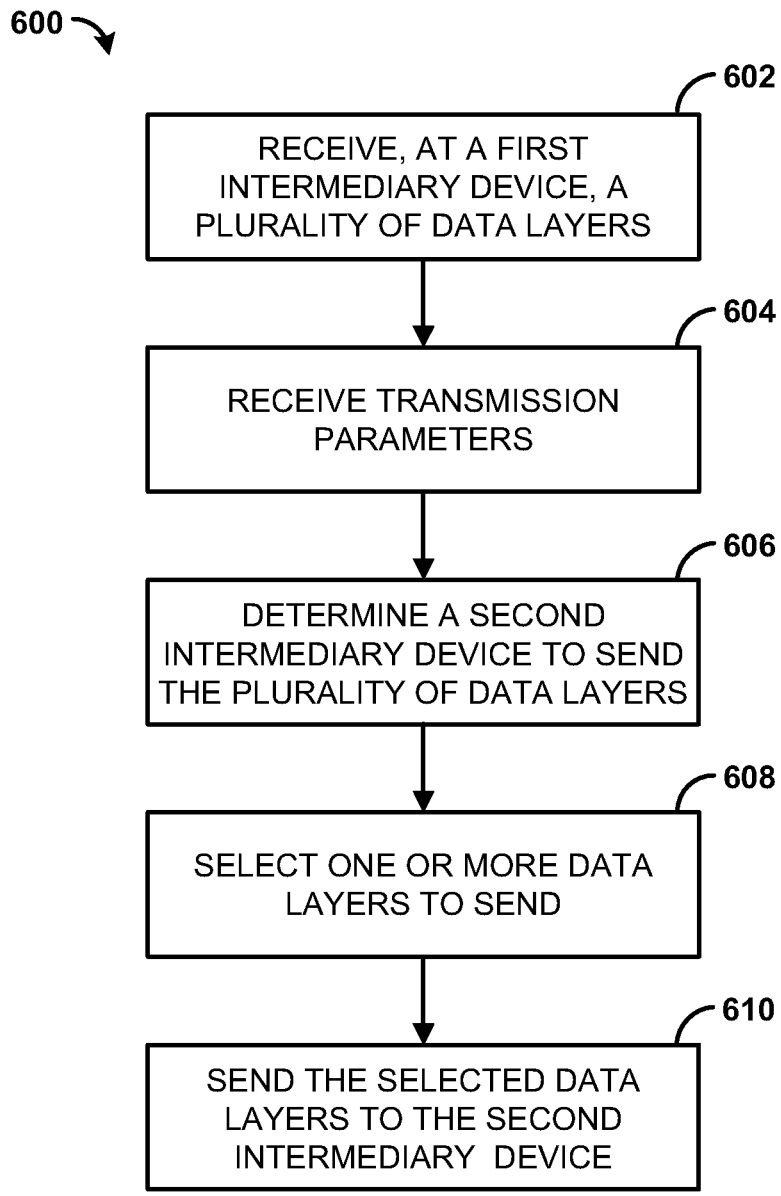
FIG. 6 is a flow chart of an example method.

FIG. 6 illustrates a method 600 for receiving and transmitting data layers received from a publishing device such as the device 302 of FIG. 3. In step 602, one or more first intermediary devices, such as device 306 of FIG. 3 can receive a plurality of data layers. The plurality of data layers can be data layers that comprise published data originating from the publishing device 302. The publishing device 302 could have received a request from a requesting device 310 with viewing parameters for the published data. The publishing device 302 could have generated the data layers for the published data based on the number of requesting devices, viewing parameters of the requesting devices, and transmission parameters of the various devices on the network.

In step 604, the first intermediary device 306 can receive transmission parameters, a transmission path for the plurality of data layers from the publishing device 302 through a plurality of devices to a requesting device, such as requesting device 310, and viewing parameters of one or more requesting devices. In an aspect where a link on the transmission path goes down or is added to the network, the transmission path can be recalculated by the first intermediary device 306 to determine a second transmission path to the requesting devices.

In step 606, the first intermediary device 306 can determine a second intermediary device of the plurality of devices on the transmission path to transmit the plurality of data layers. The determination can be based off of the transmission parameters, the transmission path, and viewing parameters. The transmission parameters can be, for example, one or more of, network resources, processor resources, transcoding resources, established links between devices, network bandwidth rating associated with each link, packet loss metric associated with each link, latency, and the like. For example, the first intermediary device 306 can determine second intermediary devices on the network that are requesting the data. The first intermediary device 306 can determine that a transmission path to the requesting device 310 through at least one of the second intermediary devices requesting the data is a more optimal path than through the transmission path determined by the publishing device 302. In another example, first intermediary device 306 can determine which data layers go to one or more second intermediary devices on one or more transmission paths. In an aspect, the first intermediary device 306 can determine which data layers the first intermediary device 306 can present locally if the first intermediary device 306 has requested the data. The first intermediary device 306 can then transmit at least a portion of the data layers to the second intermediary device.

In step 608, the first intermediary device 306 can select one or more of the plurality of data layers to transmit to the second intermediary device. The determination can be based from the transmission parameters, the transmission path, and the viewing parameters. The first intermediary device 306 can take into account which data layers are available and which data layers are destined to requesting devices further down the transmission path.

In step 610, the first intermediary device 306 can send the one or more data layers selected to the second intermediary device on the transmission path. In an aspect, the first intermediary device 306 can send the one or more data layers to a second intermediary device that is also connected to the first intermediary device 306 and not on the transmission path. In an aspect, the first intermediary device 306 can determine that the first intermediary device 306 requested published data and which of the one or more data layers to extract from the transmission. In an aspect where the first intermediary device 306 extracts more than one data layer, the first intermediary device 306 can decode the more than one data layers into the published data that was requested by the first intermediary device 306. The first intermediary device 306 can render the decoded published data for a user to receive in the form of one or more of audio data, video data, image data, text data, animation data and the like.

As described in greater detail below, provided are systems for data distribution between devices. In an aspect, the methods and systems disclosed can utilize one or more computers to perform one or more functions in one or more locations.

In an aspect, the methods and systems can be implemented on a computer 701 as illustrated in FIG. 7 and described below. By way of example, device 202a,b,c,d of FIG. 2 and devices 302-310 of FIG. 3 can be a computer 701 as illustrated in FIG. 7. Similarly, the methods and systems disclosed can utilize one or more computers to perform one or more functions in one or more locations. FIG. 7 is a block diagram illustrating an exemplary operating environment 700 for performing the disclosed methods. This exemplary operating environment 700 is only an example of an operating environment and is not intended to suggest any limitation as to the scope of use or functionality of operating environment architecture. Neither should the operating environment 700 be interpreted as having any dependency or requirement relating to any one or combination of components illustrated in the exemplary operating environment 700.

The present methods and systems can be operational with numerous other general purpose or special purpose computing system environments or configurations. Examples of computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computer 701. The computer 701 can comprise one or more components, such as one or more processors 703, a system memory 712, and a bus 713 that couples various components of the computer 701 including the one or more processors 703 to the system memory 712. In the case of multiple processors 703, the computer 701 can utilize parallel computing.

The bus 713 can comprise one or more of several possible types of bus structures, such as a memory bus, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and one or more of the components of the computer 701, such as the one or more processors 703, a mass storage device 704, an operating system 705, data distribution module 706, published data 707, a network adapter 708, system memory 712, an Input/Output Interface 710, a display adapter 709, a display device 711, and a human machine interface 702, can be contained within one or more remote computing devices 714*a,b,c* at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 can comprise computer readable media in the form of volatile memory, such as random access memory (RAM), and/or non-volatile memory, such as read only memory (ROM). The system memory 712 typically can comprise data such as published data 707 and/or program modules such as operating system 705 and data distribution module 706 that are accessible to and/or are operated on by the one or more processors 703.

In another aspect, the computer 701 can also comprise other removable/non-removable, volatile/non-volatile computer storage media. The mass storage device 704 can provide non-volatile storage of computer code, computer readable instructions, data structures, program modules, and other data for the computer 701. For example, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EE-PROM), and the like.

Optionally, any number of program modules can be stored on the mass storage device 704, including by way of example, an operating system 705 and data distribution module 706. One or more of the operating system 705 and data distribution module 706 (or some combination thereof) can comprise elements of the program modules and the data distribution module 706. Published data 707 can also be stored on the mass storage device 704. Published data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 715.

In another aspect, the user can enter commands and information into the computer 701 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 703 via a human machine interface 702 that is coupled to the bus 713, but can be connected by other interface and bus structures, such as a parallel port, game port, an IEEE 1394 Port (also known as a Firewire port), a serial port, network adapter 708, and/or a universal serial bus (USB).

In yet another aspect, a display device 711 can also be connected to the bus 713 via an interface, such as a display adapter 709. It is contemplated that the computer 701 can have more than one display adapter 709 and the computer 701 can have more than one display device 711. For example, a display device 711 can be a monitor, an LCD (Liquid Crystal Display), light emitting diode (LED) display, television, smart lens, smart glass, and/or a projector. In addition to the display device 711, other output peripheral devices can comprise components such as speakers (not shown) and a printer (not shown) which can be connected to the computer 701 via Input/Output Interface 710. Any step and/or result of the methods can be output in any form to an output device. Such output can be any form of visual representation, including, but not limited to, textual, graphical, animation, audio, tactile, and the like. The display 711 and computer 701 can be part of one device, or separate devices.

The computer 701 can operate in a networked environment using logical connections to one or more remote computing devices 714*a,b,c*. By way of example, a remote computing device 714*a,b,c* can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 701 and a remote computing device 714a,b,c can be made via a network 715, such as a local area network (LAN) and/or a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components can reside at various times in different storage components of the computing device 701, and are executed by the one or more processors 703 of the computer 701. An implementation of data distribution module 706 can be stored on or transmitted across some form of computer readable media. Any of the disclosed methods can be performed by computer readable instructions embodied on computer readable media. Any of the disclosed methods in referenced in FIGS. 1-6 can be performed by the data distribution module 706. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
receiving, by a computing device and from a requesting device, a first request for the requesting device to receive content;
receiving, by the computing device and from an intermediary device, a second request for the intermediary device to receive the content;
determining, based on the first request and the second request, one or more intermediary devices that establish a transmission path from the computing device to the requesting device, wherein the one or more intermediary devices comprise the intermediary device; and
sending, to a first intermediary device of the one or more intermediary devices, a bit stream comprising the content.

2. The method of claim 1, wherein determining the one or more intermediary devices that establish the transmission path from the computing device to the requesting device is based on a transmission parameter comprising one or more of a processor resource, a transcoding resource, or a network resource.

3. The method of claim 1, wherein the first request comprises a parameter and wherein the parameter comprises one or more of a video resolution, a video bit rate, a video codec, an audio codec, an audio bit rate, a frame rate, a color space, an accessibility feature, or closed captioning.

4. The method of claim 1, wherein the content comprises one or more of text, an image, a vector, a highlight, an animation, a video, audio, or an overlay.

5. The method of claim 1, further comprising:
receiving, from the requesting device or one intermediary device of the one or more intermediary devices, an action request to adjust the bit stream; and
modifying, based on the action request, the bit stream.

6. The method of claim 1, wherein sending the bit stream comprising the content comprises sending the bit stream at multiple bit rates.

7. An apparatus comprising:
one or more processors; and
memory storing processor-executable instructions, that when executed by the one or more processors, cause the apparatus to:
receive, from a requesting device, a first request for the requesting device to receive content;
receive, from an intermediary device, a second request for the intermediary device to receive the content;
determine, based on the first request and the second request, one or more intermediary devices that establish a transmission path to the requesting device, wherein the one or more intermediary devices comprise the intermediary device; and
send, to a first intermediary device of the one or more intermediary devices, a bit stream comprising the content.

8. The apparatus of claim 7, wherein the processor-executable instructions that, when executed by the one or more processors, cause the apparatus to determine the one or more intermediary devices that establish the transmission path from the apparatus to the requesting device, cause the apparatus to determine the one or more intermediary devices based on a transmission parameter comprising one or more of a processor resource, a transcoding resource, or a network resource.

9. The apparatus of claim 7, wherein the first request comprises a parameter, wherein the second request comprises a second parameter, and wherein one or more of the parameter or the second parameter comprises a viewing parameter.

10. The apparatus of claim 9, wherein the viewing parameter comprises one or more of a video resolution, a video bit rate, a video codec, an audio codec, an audio bit rate, a frame rate, a color space, an accessibility feature, or closed captioning.

11. The apparatus of claim 7, wherein the content comprises one or more of text, an image, a vector, a highlight, an animation, a video, audio, or an overlay.

12. The apparatus of claim 7, wherein the processor-executable instructions, when executed by the one or more processors, further cause the apparatus to:
receive, from the requesting device or one intermediary device of the one or more intermediary devices, an action request to adjust the bit stream; and
modify, based on the action request, the bit stream.

13. The apparatus of claim 7, wherein the processor-executable instructions that, when executed by the one or more processors, cause the apparatus to send the bit stream comprising the content, further cause the apparatus to send the bit stream at multiple bit rates.

14. A system comprising:
a requesting device configured to:
send a first request for the requesting device to receive content; and
at least one computer configured to:
receive the first request for the content;
receive, from an intermediary device, a second request for the intermediary device to receive the content;
determine, based on the first request and the second request, one or more intermediary devices that establish a transmission path from the at least one computer to the requesting device, wherein the one or more intermediary devices comprise the intermediary device; and
send, to a first intermediary device of the one or more intermediary devices, a bit stream comprising the content.

15. The system of claim 14, wherein the at least one computer is configured to determine the one or more intermediary devices that establish the transmission path from the at least one computer to the requesting device based on a transmission parameter comprising one or more of a processor resource, a transcoding resource, or a network resource.

16. The system of claim 14, wherein the first request comprises a parameter, wherein the second request comprises a second parameter, and wherein one or more of the parameter or the second parameter comprises a viewing parameter.

17. The system of claim 16, wherein the viewing parameter comprises one or more of a video resolution, a video bit rate, a video codec, an audio codec, an audio bit rate, a frame rate, a color space, an accessibility feature, or closed captioning.

18. The system of claim 14, wherein the content comprises one or more of text, an image, a vector, a highlight, an animation, a video, audio, or an overlay.

19. The system of claim 14, wherein the at least one computer is further configured to:
receive, from the requesting device or one intermediary device of the one or more intermediary devices, an action request to adjust the bit stream; and
modify, based on the action request, the bit stream.

20. The system of claim 14, wherein the at least one computer, being configured to send the bit stream, is further configured to send the bit stream at multiple bit rates.

* * * * *